E. COLLINS.
FISH PLATE AND NUT LOCK.
APPLICATION FILED SEPT. 15, 1919.

1,334,889.

Patented Mar. 23, 1920.
2 SHEETS—SHEET 1.

Inventor
Edgar Collins

By Victor J. Evans
Attorney

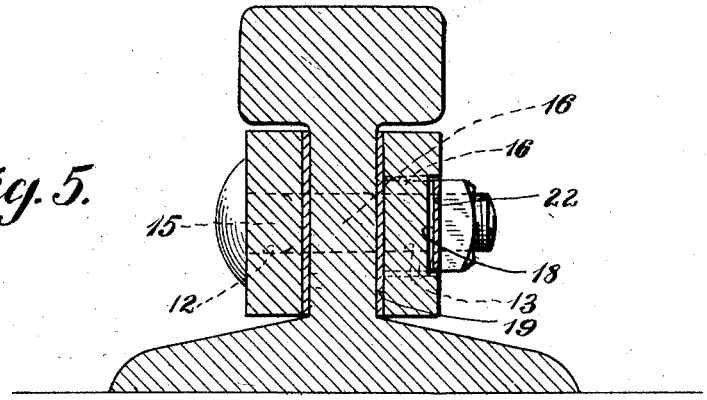
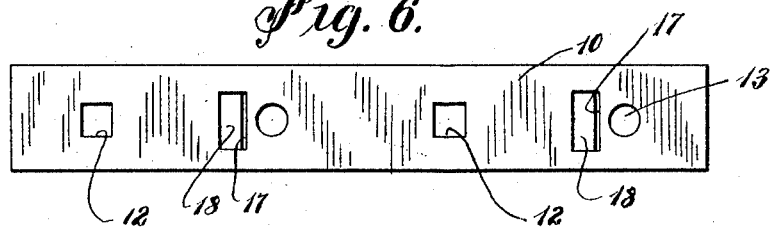
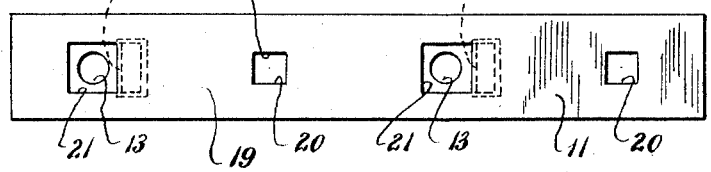
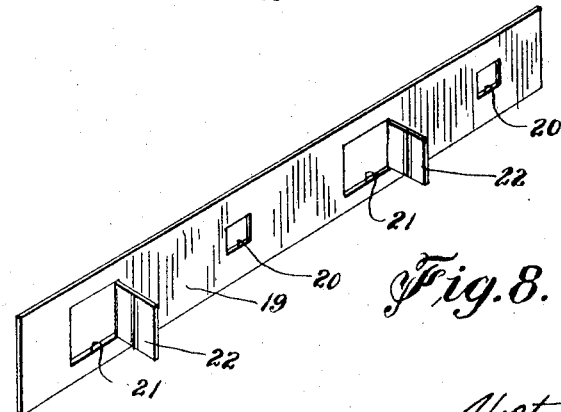

UNITED STATES PATENT OFFICE.

EDGAR COLLINS, OF ALGONQUIN, WEST VIRGINIA.

FISH-PLATE AND NUT-LOCK.

1,334,889.        Specification of Letters Patent.     Patented Mar. 23, 1920.

Application filed September 15, 1919. Serial No. 323,723.

*To all whom it may concern:*

Be it known that I, EDGAR COLLINS, a citizen of the United States, residing at Algonquin, in the county of Wyoming and State of West Virginia, have invented new and useful Improvements in Fish-Plates and Nut-Locks, of which the following is a specification.

This invention relates to railroad rail fastening devices and has for its object the provision of novelly constructed fish plates and nut lock members associated therewith whereby the nuts upon the bolts employed for holding the fish plates and rails together cannot become dislocated.

An important object is the provision of fish plates with which are associated metallic plates coextensive therewith provided with holes for the passage of securing bolts, the metallic plates having formed thereon tongues which pass through slots formed in the fish plates and which are normally seated flush within recesses in the outer faces of the fish plates, which are upsettable or bendable into engagement with the sides of the nuts engaged upon the bolts.

An additional object is the provision of a structure of this character which will be simple and inexpensive in manufacture, highly efficient in use, positive in action, durable in service, and a general improvement in the art.

With the above and other objects and advantages in view, the invention consists in the details of construction to be hereinafter more fully described and claimed, and illustrated in the accompanying drawings in which—

Figure 1:
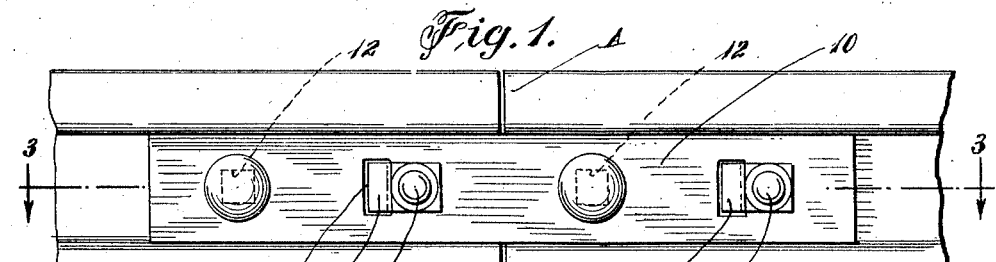
Figure 2:
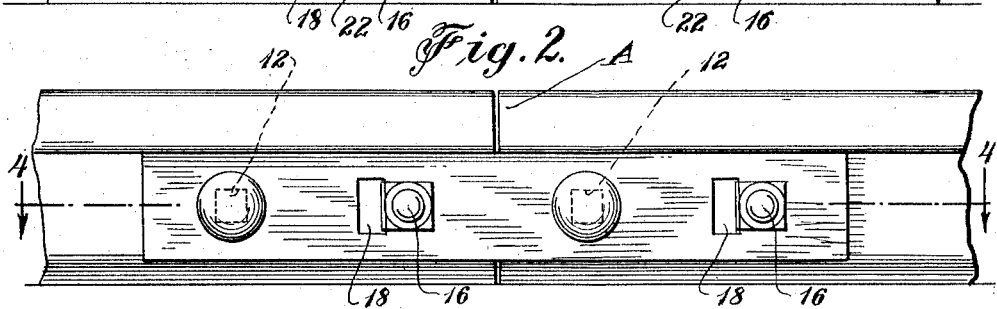
Figure 3:
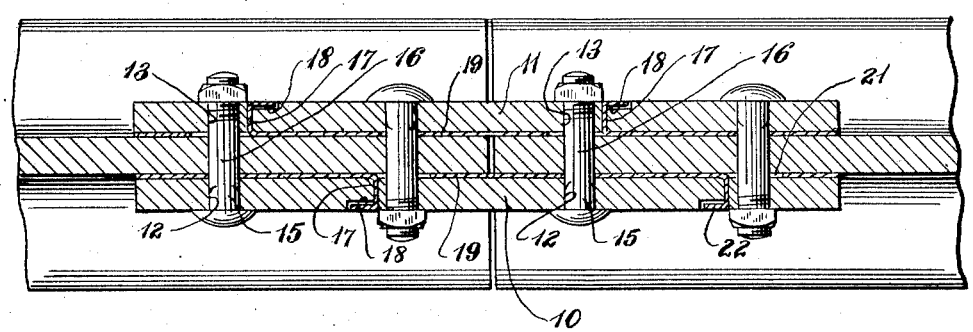
Figure 4:
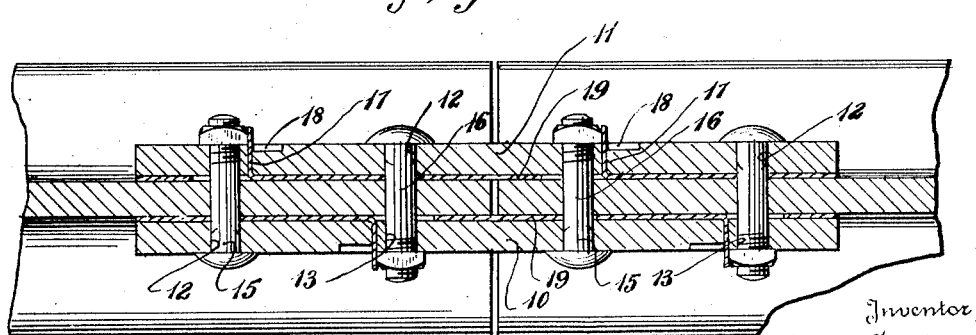

Figure 1 is a side elevation of the meeting ends of two railroad rails showing my fish plates and nut lock structure thereon with the nut locking tongues in initial position, Fig. 2 is a similar view with the tongues bent into nut locking position, Fig. 3 is a horizontal sectional view taken through the centers of the bolts and along the line 3—3 of Fig. 1, Fig. 4 is a similar view on the line 4—4 of Fig. 2, Fig. 5 is a vertical cross sectional view taken through one of the tongues, Fig. 6 is a side elevation of one of the fish plates detached, Fig. 7 is an inside face view of one of the fish plates with the metallic plate thereagainst, and Fig. 8 is a perspective view of one of the metallic plates.

Referring more particularly to the drawings, the letter A designates the meeting ends of railroad rails. In carrying out my invention I provide a pair of fish plates 10 and 11 disposed upon opposite sides of the rails and of the ordinary shape. Each fish plate is provided with rectangular holes 12 alternating with circular holes 13 and the holes 12 in the fish plate 10 are in alinement with the holes 13 in the fish plate 11, and the holes 13 in the fish plate 10 are in alinement with the holes 12 therein. It is of course understood that the holes 12 and 13 register with the bolt receiving holes 14 in the webs of the rails. The rectangular holes 12 are adapted for the reception of the square shanks 15 of the securing bolts 16, and it will be observed that owing to this specific arrangement the bolt heads and nuts on each fish plate will be in alternation. Each fish plate has formed therein adjacent the circular holes 13, slots 17 from the sides of which extend shallow recesses 18.

The nut lock means comprises a metallic plate 19 which is disposed between each fish plate and the webs of the rails and these plates are co-extensive with the fish plates. Each plate 19 has formed therein square holes 20 registering with the square holes 12 in the fish plates and each plate 19 is cut to provide square holes 21 registering with and of greater dimensions than the circular holes 13. These square holes 21 are formed by bending from the plates 19 tongues 22 which are struck from the material of the plates and which extend through the slots 17 in the fish plates. When the plates 19 are initially disposed against the fish plates the ends of the tongues 22 projecting beyond the outer faces of the fish plates are bent laterally to lie within the recesses 18 so as not to interfere with the turning down of the nuts on the bolts.

In the assembly of my device, it will be seen that after the rails have their ends brought together the previously assembled plates and fish plates are disposed against the sides of the webs thereof with the holes 10 and 11 in the fish plates registering with the holes in the rails. The bolts 16 are then passed through these registering openings and the nuts are applied and turned down as tightly as possible to hold the fish plates and rails securely associated. After this is done the operator inserts some convenient tool beneath the free edge of each tongue 22 where it lies within the recess 18 and presses the tongue outwardly and into engagement with the adjacent flat side of the nut. When this is done it will of course be evident that unscrewing of the nut will be positively prevented. In case it should be desired to remove the nuts for any reason, it is merely necessary that the tongues be bent out of engagement with the nuts and forced again into the recesses 18, whereupon the nuts may be unscrewed.

From the foregoing discription and a study of the drawings it will be apparent that I have thus provided an extremely simple and efficient fish plate having associated therewith a nut locking structure which will be positive in operation and which will at the same time be inexpensive in production and installation.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. Means for fastening the meeting ends of rails comprising fish plates disposed upon opposite sides of the webs of the rails, said fish plates being provided with square holes alternating with circular holes with the square holes in one fish plate registering with the circular holes in the other fish plate, said registering square and circular holes also registering with bolt receiving holes in the webs of the rails, said square holes being adapted for the reception of the square shanks of bolts, nuts threaded upon said bolts, each fish plate being provided adjacent the circular holes therein with a slot, a metallic plate disposed between each fish plate and the webs of the rails, said metallic plates being provided with openings for the passage of said bolts, and tongues struck from said metallic plates and extending through said slots the outer faces of said fish plates being provided with recesses at the sides of said slots receiving the laterally bent ends of said tongues whereby said tongues will be out of the path of movement of the nuts during rotation of the latter, and the projecting ends of said tongues being bendable into engagement with the adjacent nuts.

2. In combination with the meeting ends of rails and with fish plates disposed against the sides thereof, said fish plates being provided adjacent their bolt receiving holes with slots and with recesses extending from the sides of said slots, locking members formed as plates disposed between the fish plates and the rails, said plates being provided with holes for the passage of the securing bolts, and tongues struck from said plates, extending through said slots and normally bent to lie within said recesses, said tongues being bendable to extend at right angles to the faces of said fish plates in engagement with the adjacent flat sides of the nuts engaged upon said bolts.

In testimony whereof I affix my signature.

EDGAR COLLINS.